US011885471B1

(12) United States Patent
Jeong et al.

(10) Patent No.: US 11,885,471 B1
(45) Date of Patent: Jan. 30, 2024

(54) LAMP FOR VEHICLE

(71) Applicant: HYUNDAI MOBIS CO., LTD., Seoul (KR)

(72) Inventors: Seok Ho Jeong, Yongin-si (KR); Sung Won Yang, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 18/065,593

(22) Filed: Dec. 13, 2022

(30) Foreign Application Priority Data

Oct. 27, 2022 (KR) ........................ 10-2022-0140602

(51) Int. Cl.
*F21S 41/33* (2018.01)
*F21S 41/25* (2018.01)
*F21S 41/148* (2018.01)

(52) U.S. Cl.
CPC ............. *F21S 41/33* (2018.01); *F21S 41/148* (2018.01); *F21S 41/25* (2018.01)

(58) Field of Classification Search
CPC ........... F21S 41/25; F21S 41/33; F21S 41/148
See application file for complete search history.

(56) References Cited

U.S. PATENT DOCUMENTS

2015/0034987 A1 2/2015 Hayashi
2015/0325756 A1 11/2015 Hayashi
2019/0093844 A1* 3/2019 Ueno ...................... H01L 33/60
2019/0284472 A1* 9/2019 Kang ...................... C04B 35/44
2022/0268418 A1 8/2022 Park

FOREIGN PATENT DOCUMENTS

DE 10 2011 081919 2/2013
DE 10 2014 203245 8/2015
EP 3 112 742 1/2017
EP 4 008 950 6/2022
WO WO 2020/20073 10/2020
WO WO 2021/182825 9/2021

OTHER PUBLICATIONS

Extended European Search Report dated Sep. 18, 2023 issued in EP 22213068.4.
English Language Abstract of WO 2021/182825 published Sep. 16, 2021.
English Language Abstract of DE 10 2011 081919 published Feb. 28, 2013.
English Language Abstract of WO 2020/20073 published Oct. 8, 2020.
English Language Abstract of DE 10 2014 203245 published Aug. 27, 2015.
English Language Abstract of EP 3 112 742 published Jan. 4, 2017.

* cited by examiner

*Primary Examiner* — Evan P Dzierzynski
*Assistant Examiner* — Nathaniel J Lee
(74) *Attorney, Agent, or Firm* — DLA PIPER LLP (US)

(57) ABSTRACT

A lamp for a vehicle that includes a board part, a light source part disposed on an upper surface of the board part and including a plurality of light sources that irradiate light, a lens part installed to surround the light source part and disposed on an upper side of the board part, and a reflection part installed on an upper side of the board part, and including a reflective surface that reflects the light irradiated from the light source part to change a travel path of the light, and the reflective surface contacts the lens part and phosphor is deposited thereon.

14 Claims, 18 Drawing Sheets

LAMP FOR VEHICLE

CROSS-REFERENCE TO RELATED APPLICATION

This application claims the benefit of priority to Korean Patent Application No. 10-2022-0140602, filed in the Korean Intellectual Property Office on Oct. 27, 2022, the entire contents of which are incorporated herein by reference.

TECHNICAL FIELD

The present disclosure relates to a lamp for a vehicle.

BACKGROUND

Conventionally, according to a high-resolution LED module, phosphor has to be injected and coated on a surface of an LED module to implement various colors. Accordingly, a process for injection-molding the phosphor has to be added when the LED module is manufactured, and LED modules are classified into several categories. According, work efficiency is lowered when the LED module is manufactured.

Furthermore, according to the conventional LED module, the light generated by the light source is diffused in directions, other than a forward direction, and an amount of the light is lost.

Accordingly, it is necessary to develop an optical system technology, by which production efficiency may be enhanced when phosphor is formed while optical efficiency is also enhanced.

SUMMARY

The present disclosure has been made to solve the above-mentioned problems occurring in the prior art while advantages achieved by the prior art are maintained intact.

An aspect of the present disclosure provides a lamp for a vehicle that enhances production efficiency by depositing phosphor on a reflection part while not adding a separate process.

Another aspect of the present disclosure provides a lamp for a vehicle that enhances optical uniformity by depositing phosphor on a reflective surface and differentiates an image.

Another aspect of the present disclosure provides a lamp for a vehicle that implements an image pattern having various wavelengths and colors.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a lamp for a vehicle includes a board part, a light source part disposed on an upper surface of the board part and including a plurality of light sources that irradiate light, a lens part installed to surround the light source part and disposed on an upper side of the board part, and a reflection part installed on an upper side of the board part, and including a reflective surface that reflects the light irradiated from the light source part to change a travel path of the light, and the reflective surface contacts the lens part and phosphor is deposited thereon.

The lamp may further include an inner lens disposed, when a direction, in which the light reflected by the reflection part is output, is defined as an output direction, on the output direction of the lens part that outputs the light reflected by the reflection part to an outside.

The lamp may further include a housing installed on a lower side of the reflection part, and the board part, the light source part, the lens part, and the inner lens may be installed between the reflection part and the housing.

The phosphor may be deposited in an entire area of the reflective surface.

Optics protruding from a surface of the lens part, which contacts the reflection part, may be formed in the lens part, and the reflective surface may have grooves corresponding to the optics.

The optics and the grooves may be repeatedly formed along an upward direction, and the optics may be formed to become gentler as they go in the upward direction.

The reflective surface may include a plurality of reflective grooves that are recessed, and the plurality of reflective grooves may be continuously repeatedly formed in an upward/downward direction and a leftward/rightward direction of the reflective surface.

The reflective grooves may have a triangular pyramid shape.

The reflective grooves may have a hexagonal pyramid shape.

The reflective surface may include a deposition area that is an area, in which the phosphor is deposited, and a non-deposition area that is the remaining area other than the deposition area.

The deposition area may include a plurality of unit patterns having a circular shape.

The deposition area may include a plurality of pattern groups, each of the plurality of pattern groups may include a plurality of unit patterns having the same size, and sizes of the unit patterns may become larger as the pattern groups of the unit patterns are located at locations that are farther from a center of the light source.

The deposition area may have a plurality of unit patterns having a line shape and crossing each other to form a lattice shape, and the non-deposition area may include a plurality of lattice areas by the plurality of unit patterns.

Intervals between adjacent ones of the plurality of unit patterns may become larger as the adjacent ones are located at locations that are farther from the light source.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Hereinafter, embodiments of the present disclosure will be described in detail with reference to the accompanying drawings.

First, the embodiments described herein are embodiments that are suitable for understanding the technical features of a lamp for a vehicle according to the present disclosure. However, the present disclosure is not limited to the embodiment described below or the technical features of the present disclosure are not limited by the described embodiments, and the present disclosure may be variously modified without departing from the technical scope of the present disclosure.

First Embodiment

Figure 1:
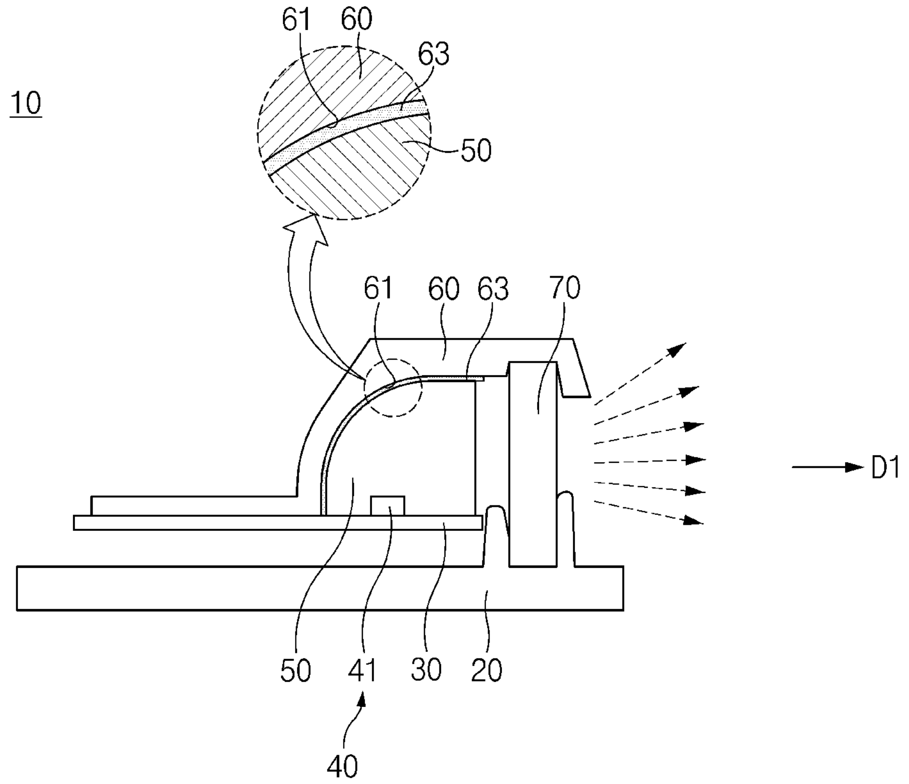
FIG. 1 is a cross-sectional view illustrating a lamp for a vehicle according to a first embodiment of the present disclosure.

FIG. 1 is a cross-sectional view illustrating a lamp for a vehicle according to a first embodiment of the present disclosure.

Referring to FIG. 1, a lamp 10 for a vehicle according to a first embodiment of the present disclosure includes a board part 30, a light source part 40, a lens part 50, and a reflection part 60. Furthermore, the lamp 10 for a vehicle according to the first embodiment of the present disclosure may further include an inner lens 70 and a housing 20.

The board part 30 may be a printed circuit board (PCB).

The light source part 40 includes a plurality of light sources 41 that are disposed on an upper side of the board part 30 and irradiate light. Various elements or devices, which may emit light, may be used for the light source part 40. For example, the light source 41 may be a light emitting diode (hereinafter, an LED).

The lens part 50 is installed to surround the light source part 40 and is disposed on an upper surface of the board part 30. The lens part 50 is formed to be filled between the board part 30 and a reflective surface 61 of the reflection part 60. That is, a lower surface of the lens part 50 may be formed to contact the board part 30 and one surface thereof may be formed to contact the reflective surface 61 of the reflection part 60. A shape of the lens part 50 may be changed according to shapes of the board part 30 and the reflection part 60.

The reflection part 60 is installed on an upper side of the board part 30, and includes the reflective surface 61 that reflects the light irradiated from the light source part 40 to change a travel path of the light.

Furthermore, the reflective surface 61 is configured to contact the lens part 50, and phosphor 63 is deposited thereon.

In detail, a phosphor layer 63 may be formed on the reflective surface 61 of the reflection part 60, which contacts the lens part. A method for depositing the phosphor 63 in the reflection part 60 is not limited. For example, after the phosphor layer 63 is manufactured and the reflection part 60 is injection-molded, the manufactured phosphor layer 63 may be attached on a rear surface of the reflection part 60. Alternatively, for example, after injection-molding the reflection part 60, the phosphor 63 may be deposited by applying the phosphor 63 on the reflective surface 61 through coating. For example, the reflection part 60 may be formed of a polycarbonate material, but the present disclosure is not limited thereto.

Accordingly, according to an embodiment of the present disclosure, the phosphor 63 may be efficiently implemented without adding a separate process by depositing the phosphor 63 on the reflective surface 61 when the reflection part 60 is injection-molded.

Furthermore, according to an embodiment of the present disclosure, a uniformity of the light may be enhanced by depositing the phosphor 63 on the reflective surface 61, and images may be differentiated.

Furthermore, according to an embodiment of the present disclosure, optical patterns having various wavelengths and colors may be implemented by varying a color of the phosphor 63 deposited on the reflective surface 61 when the reflection part 60 is manufactured.

Furthermore, according to an embodiment of the present disclosure, since an optical structure, in which a travel path of the light irradiated from the light source 41 is changed such that the light is output, is applied, an air gap that is an interval between the light source part 40 and the reflective surface 61 or between the reflective surface 61 and the inner lens 70 may be secured to be long. Accordingly, according to the present disclosure, the light emitted from the light source 41 may be refracted/ reflected in a specific direction, and thus, diffusion of the light may be minimized and optical efficiency may be enhanced.

Meanwhile, the first embodiment of the present disclosure may further include the inner lens 70. When a direction, in which the light reflected by the reflection part 60 is output, is defined as an output direction D1, the inner lens 70 may be disposed in the output direction D1 of the lens part 50, and the light reflected by the reflection part 60 may be output to an outer side.

In detail, the output direction D1 may be a direction, in which the light reflected by the reflection part 60 is output to an outside, and for example, when the lamp 10 for a vehicle is a rear lamp, the output direction D1 may be a rearward direction with respect to a forward/rearward direction of the vehicle. However, the output direction D1 may be changed to a forward direction or a lateral direction according a mounting location of the lamp 10 for a vehicle.

The inner lens 70 may be disposed in the output direction D1 of the lens part 50, and may output the light that is reflected by the reflection part 60 and passes through the lens part 50 to the outside. Although not illustrated, the first embodiment of the present disclosure may further include an outer lens that is spaced apart from the inner lens 70.

Meanwhile, the present disclosure may further include the housing 20 that is installed on a lower side of the reflection part 60. Furthermore, the board part 30, the light source part 40, the lens part 50, and the inner lens 70 may be installed between the reflection part 60 and the housing 20.

For example, the inner lens 70 may be fixed between the housing 20 and the reflection part 60. The housing 20 may function to protect the board part 30, the light source part 40, the lens part 50, and the inner lens 70 by surrounding them, together with the reflection part 60.

Meanwhile, referring to FIG. 1, the phosphor 63 may be deposited in the entire area of the reflective surface 61. That is, the first embodiment of the present disclosure may implement the phosphor layer 63 by depositing the phosphor 63 on the entire reflective surface 61 that is a surface that faces the lens part 50 of the reflection part 60.

Accordingly, the reflection part 60 may reflect all the light that reaches the reflective surface 61 in the output direction D1.

Hereinafter, second to sixth embodiments of the present disclosure will be described with reference to FIGS. 2 to 18. The second to sixth embodiments of the present disclosure may be different from the first embodiment of the present disclosure in the lens part 50 or the reflective surface 61. Accordingly, the second to sixth embodiments of the present disclosure may include all of the configurations of the first embodiment of the present disclosure, except for the above-described differences. For example, the second to sixth embodiments of the present disclosure also may include board parts 30*a*, 30*b*, 30*c*, 30*d*, and 30*e*, light source parts 40*a*, 40*b*, 40*c*, 40*d*, and 40*e*, lens parts 50*a*, 50*b*, 50*c*, 50*d*, and 50*e*, reflection parts 60*a*, 60*b*, 60*c*, 60*d*, and 60*e*, and configurations thereof, and may include all of the inner lens 70 and housings 20*a*, 20*b*, 20*c*, 20*d*, and 20*e*.

Hereinafter, a repeated description of the same configurations as the above-described ones will be omitted.

Second Embodiment

Figure 2:
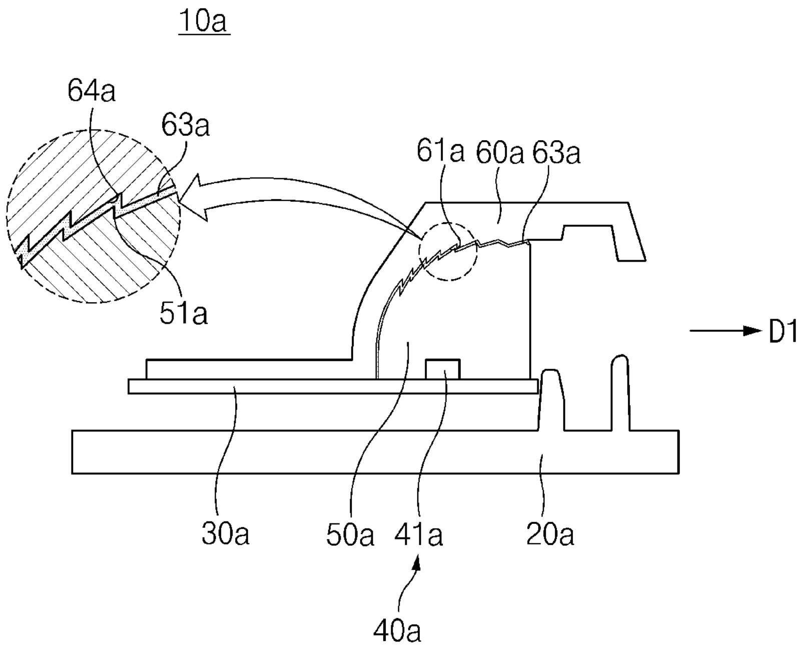
FIG. 2 is a cross-sectional view illustrating a lamp for a vehicle according to a second embodiment of the present disclosure.
Figure 3:
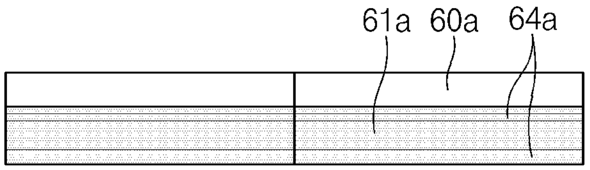
FIG. 3 is a view of a reflection part according to the second embodiment of the present disclosure, when viewed from a lower side.
Figure 4:
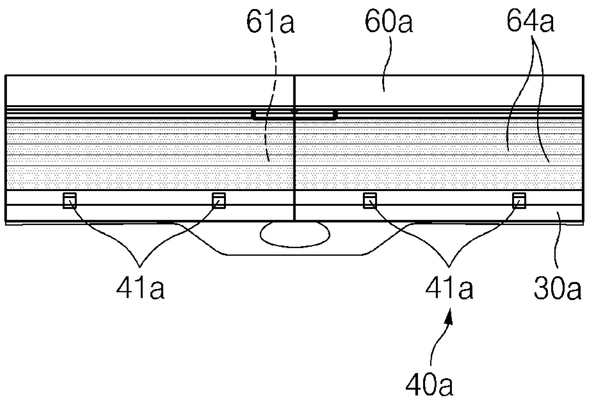
FIG. 4 is a front view illustrating the lamp for a vehicle according to the second embodiment of the present disclosure, when viewed from a front side.

FIG. 2 is a cross-sectional view illustrating a lamp for a vehicle according to a second embodiment of the present disclosure. FIG. 3 is a view of a reflection part according to the second embodiment of the present disclosure, when viewed from a lower side. FIG. 4 is a front view illustrating the lamp for a vehicle according to the second embodiment of the present disclosure, when viewed from a front side.

Referring to FIGS. 2 to 4, a lamp 10*a* for a vehicle according to a second embodiment of the present disclosure may include the board part 30*a*, the light source part 40*a* including a plurality of light sources 41*a*, the lens part 50*a*, and the reflection part 60*a* including a reflective surface 61*a*.

Furthermore, the lens part 50*a* may have an optic 51*a* that protrudes from a surface that contacts the reflection part 60*a*. Furthermore, the reflective surface 61*a* may have a groove 64*a* corresponding to the optic 51*a*.

A shape of the optic 51*a* may be variously changed according to an optical pattern design specification of the applied optical system. For example, the optic 51*a* may have a shape that extends in a leftward/rightward direction, and a plurality of optics 51*a* may be continuously formed along an upward/downward direction of the reflective surface 61*a*.

Then, a shape (a vertical cross-section) of the optic 51*a* that is perpendicular to an extension direction of the optic 51*a* may have a saw-tooth shape that is engaged with the groove 64*a* of the reflective surface 61*a*. An aspect that the groove 64*a* is formed to correspond to the optic 51*a* means that the optic 51*a* has a shape that is similar thereto to be accommodated in or engaged with the groove 64*a*.

Furthermore, for example, the optics 51*a* and the grooves 64*a* are repeatedly formed along the upward direction, and the optic 51*a* may be formed to become gentler as it goes in the upward direction. Furthermore, the groove 64*a* of the reflective surface 61*a* also may be formed to be gentler as it goes in the upward direction. A travel path of the light irradiated from the light source 41*a* may be controlled by the shapes of the groove 64*a* and the optic 51*a*.

According to the design of the shapes of the optic 51*a* and the groove 64*a*, the light generated by the light source 41*a* may be uniformly output in an output direction D1 after being reflected by the reflection part 60*a*, and the diffusion of the light may be minimized and optical efficiency may be increased. However, the shapes of the optic 51*a* and the groove 64*a* are not limited to those in the illustrated embodiment.

Third Embodiment

Figure 5:
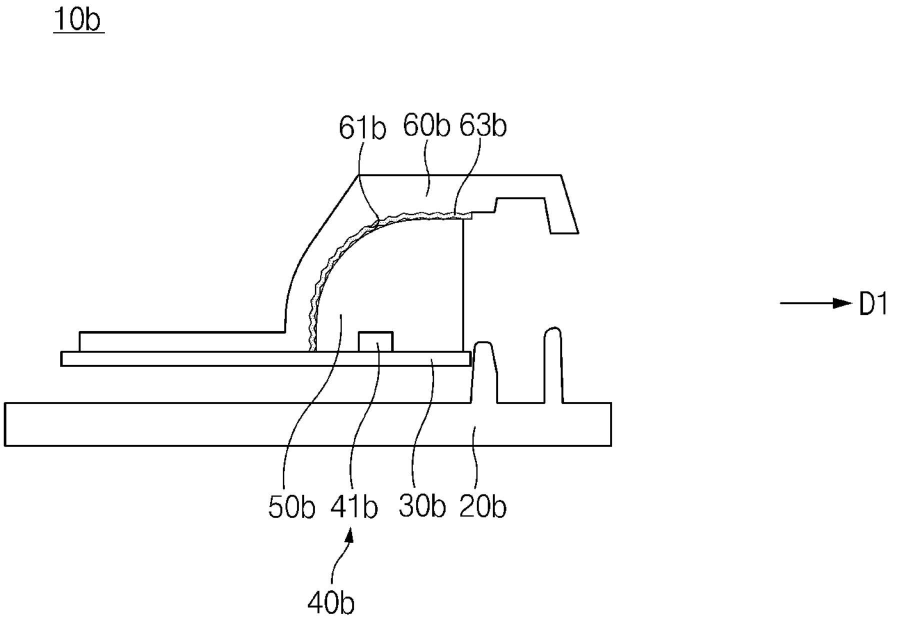
FIG. 5 is a cross-sectional view illustrating a lamp for a vehicle according to a third embodiment of the present disclosure.
Figure 6:
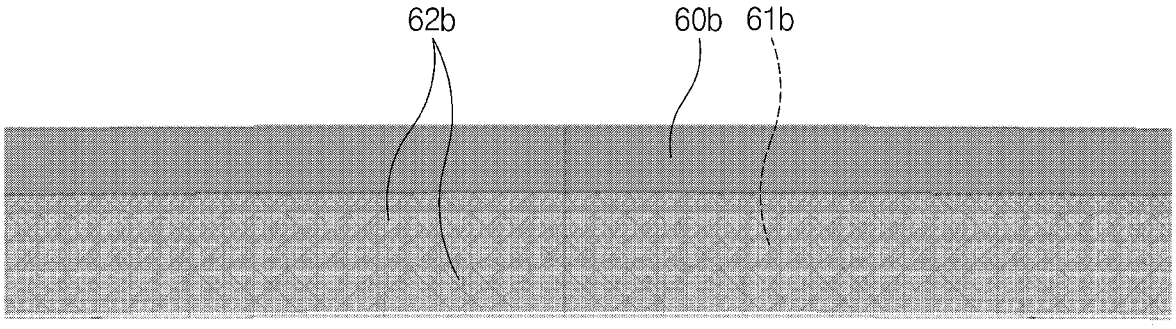
FIG. 6 is a view of a reflection part according to the third embodiment of the present disclosure, when viewed from a lower side.
Figure 7:
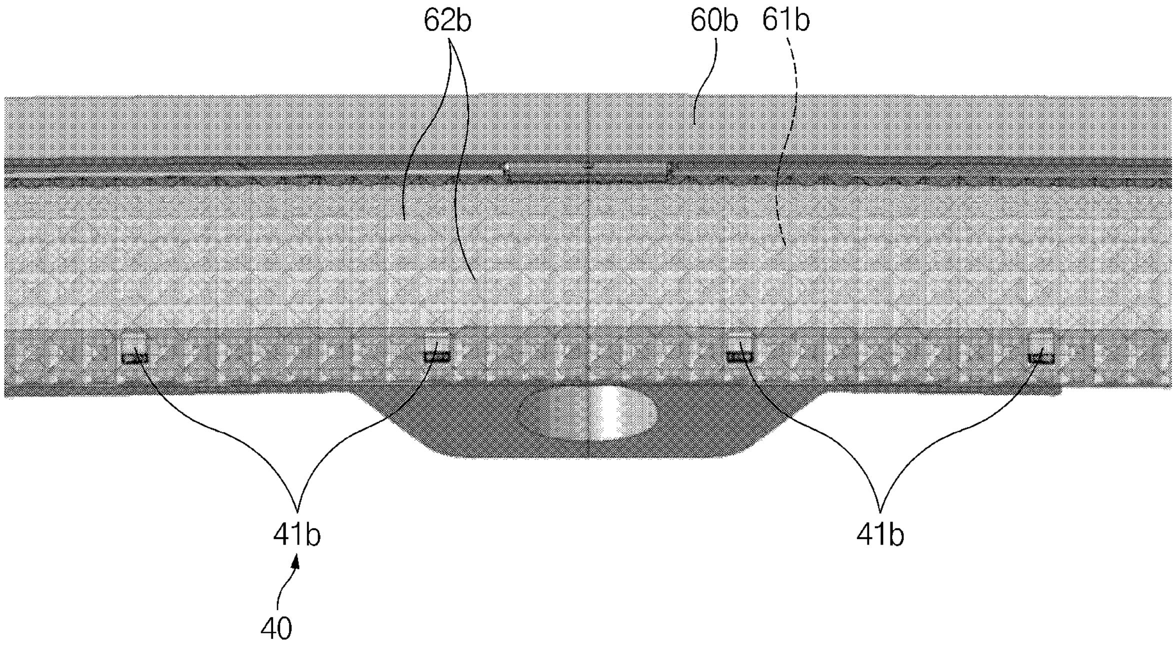
FIG. 7 is a front view illustrating the lamp for a vehicle according to the third embodiment of the present disclosure, when viewed from a front side.

FIG. 5 is a cross-sectional view illustrating a lamp for a vehicle according to a third embodiment of the present disclosure. FIG. 6 is a view of a reflection part according to the third embodiment of the present disclosure, when viewed from a lower side. FIG. 7 is a front view illustrating the lamp for a vehicle according to the third embodiment of the present disclosure, when viewed from a front side.

Referring to FIGS. 5 to 7, a lamp 10*b* for a vehicle according to a third embodiment of the present disclosure may include the board part 30*b*, the light source part 40*b* including a plurality of light sources 41*b*, the lens part 50*b*, and the reflection part 60*b* including a reflective surface 61*b*.

Furthermore, the reflective surface 61*b* may include a plurality of reflective grooves 62*b* that are formed to be concave. Furthermore, the plurality of reflective grooves 62*b* may be continuously repeatedly formed in the upward/downward direction and the leftward/rightward direction of the reflective surface 61*b*.

In detail, in the reflection part 60*b* according to the third embodiment, images of light distribution patterns may be variously determined by forming convexo-concave patterns on the reflective surface 61*b* that is a deposition area in various shapes. For example, the reflective grooves 62*b* of a polygonal shape, which are continuous in the upward/downward direction and the leftward/rightward direction, may be formed on the reflective surface 61*b*.

For example, the reflective groove 62*b* may have a triangular pyramid shape. Light distribution pattern images may be differentiated by forming the reflective groove 62*b* of the triangular pyramid shape and depositing the phosphor 63*b*. However, the shape of the reflective groove 62*b* is not limited thereto.

Fourth Embodiment

Figure 8:
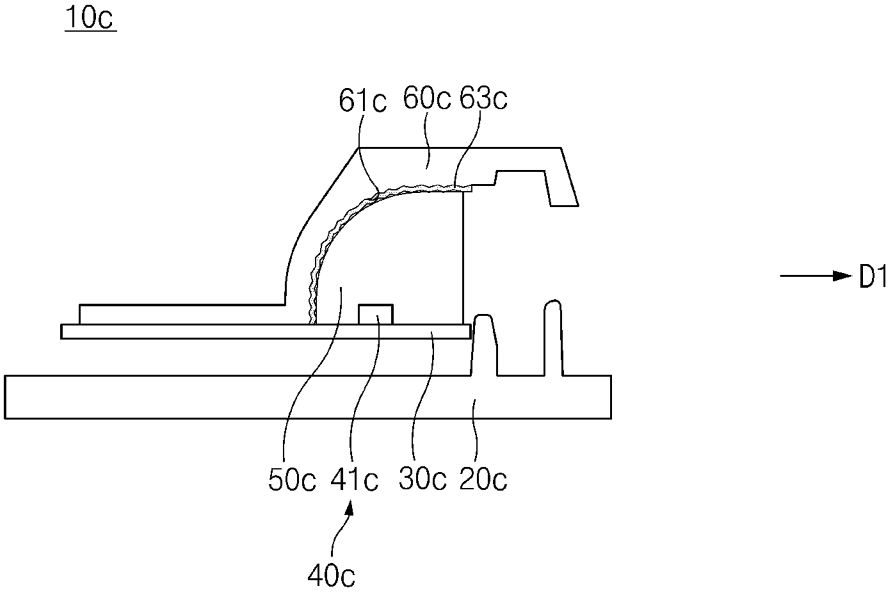
FIG. 8 is a cross-sectional view illustrating a lamp for a vehicle according to a fourth embodiment of the present disclosure.
Figure 9:
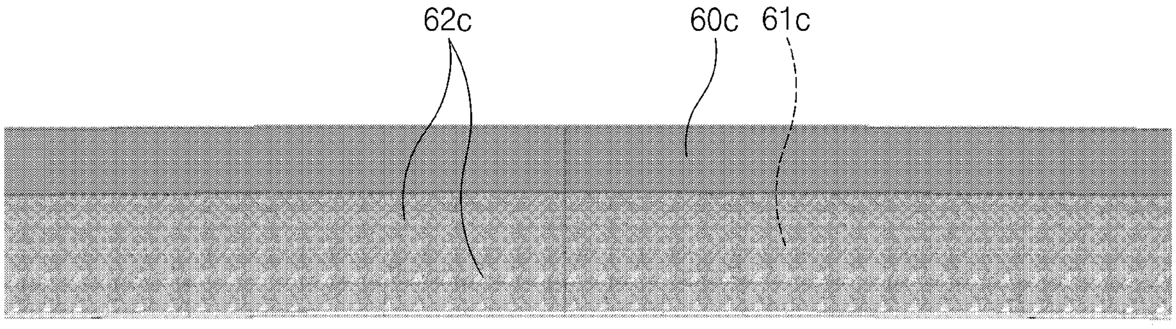
FIG. 9 is a view of a reflection part according to the fourth embodiment of the present disclosure, when viewed from a lower side.
Figure 10:
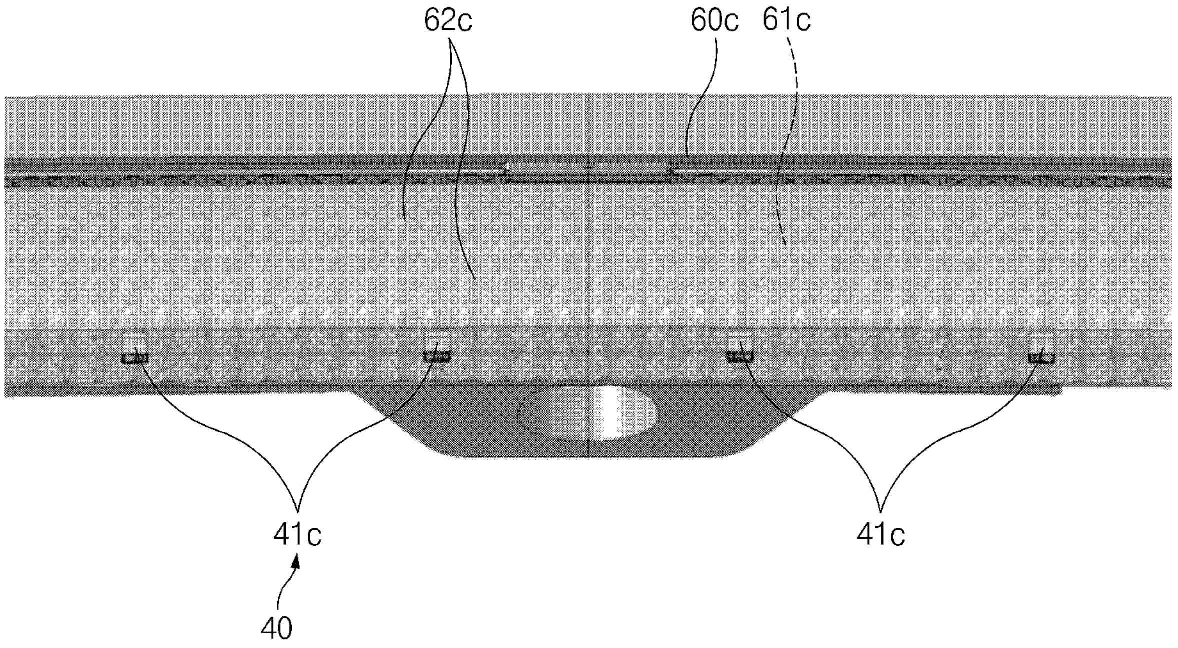
FIG. 10 is a front view illustrating the lamp for a vehicle according to the fourth embodiment of the present disclosure, when viewed from a front side.

FIG. 8 is a cross-sectional view illustrating a lamp for a vehicle according to a fourth embodiment of the present disclosure. FIG. 9 is a view of a reflection part according to the fourth embodiment of the present disclosure, when viewed from a lower side. FIG. 10 is a front view illustrating the lamp for a vehicle according to the fourth embodiment of the present disclosure, when viewed from a front side.

Referring to FIGS. 8 to 10, a lamp 10*c* for a vehicle according to a fourth embodiment of the present disclosure may include the board part 30*c*, the light source part 40*c* including a plurality of light sources 41*c*, the lens part 50*c*, and the reflection part 60*c* including a reflective surface 61*c*.

Furthermore, the reflective surface 61*c* may include a plurality of reflective grooves 62*c* that are formed to be concave. Furthermore, the plurality of reflective grooves 62*c* may be continuously repeatedly formed in the upward/downward direction and the leftward/rightward direction of the reflective surface 61*c*.

In detail, in the reflection part 60*c* according to the fourth embodiment, images of light distribution patterns may be variously determined by forming convexo-concave patterns on the reflective surface 61*c* that is a deposition area in various shapes. For example, the reflective grooves 62*c* of a polygonal shape, which are continuous in the upward/downward direction and the leftward/rightward direction, may be formed on the reflective surface 61*c*.

For example, the reflective groove 62*c* may have a hexagonal pyramid shape. A light distribution pattern image may be differentiated by forming the reflective groove 62*c* of the hexagonal pyramid shape and depositing the phosphor 63*c*. However, the shape of the reflective groove 62*c* is not limited thereto.

Fifth Embodiment

Figure 11:
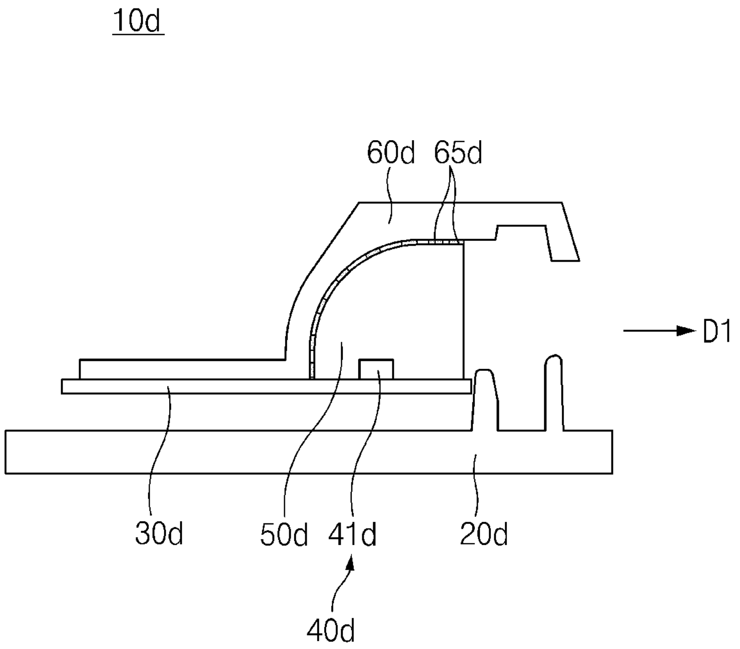
FIG. 11 is a cross-sectional view illustrating a lamp for a vehicle according to a fifth embodiment of the present disclosure.
Figure 12:
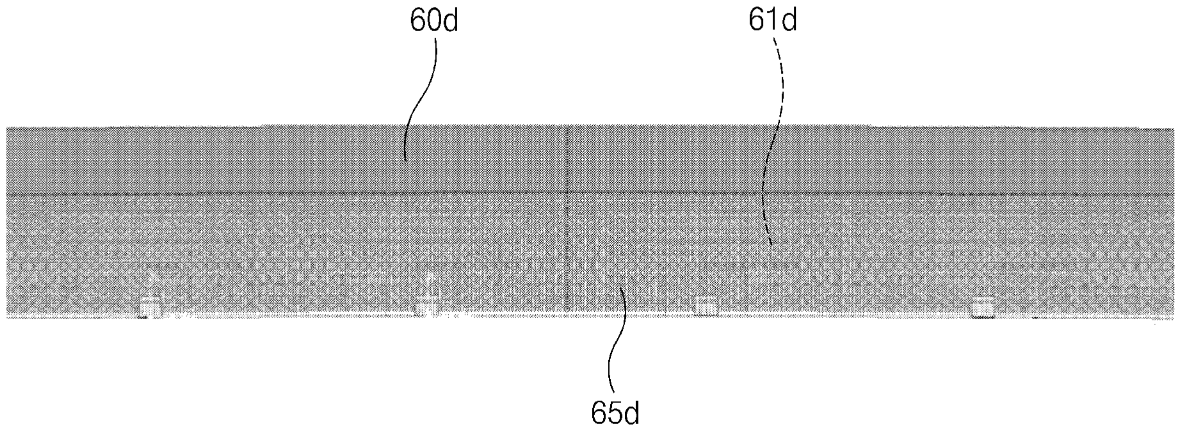
FIG. 12 is a view of a reflection part according to the fifth embodiment of the present disclosure, when viewed from a lower side.
Figure 13:
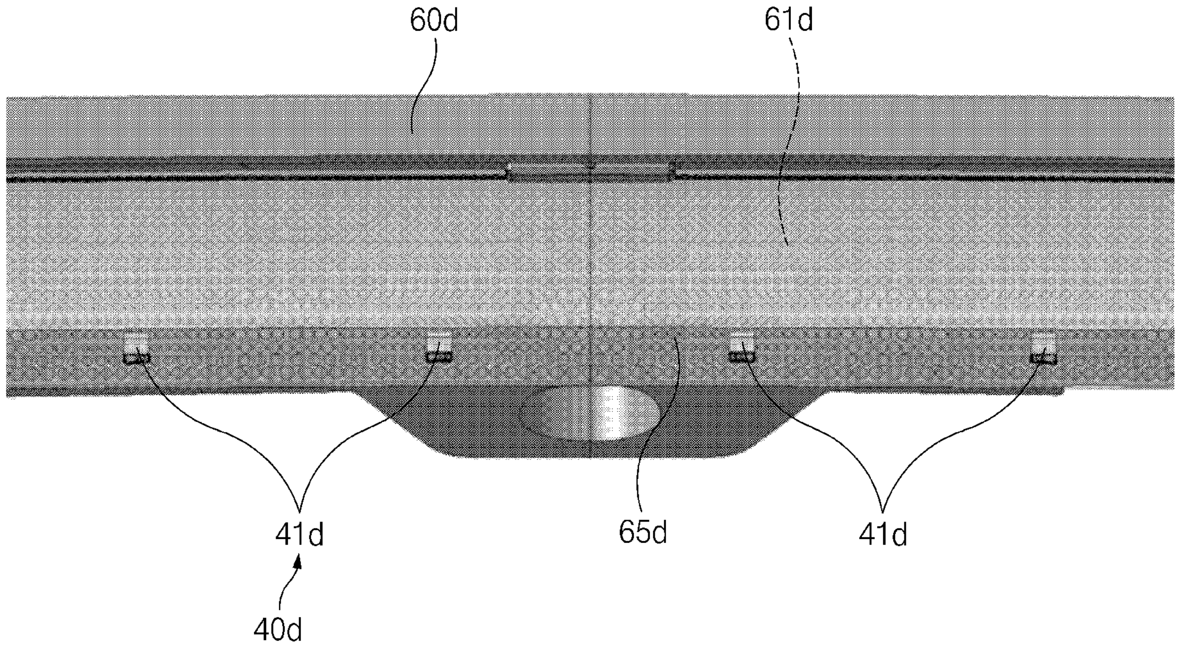
FIG. 13 is a front view illustrating the lamp for a vehicle according to the fifth embodiment of the present disclosure, when viewed from a front side.
Figure 14:
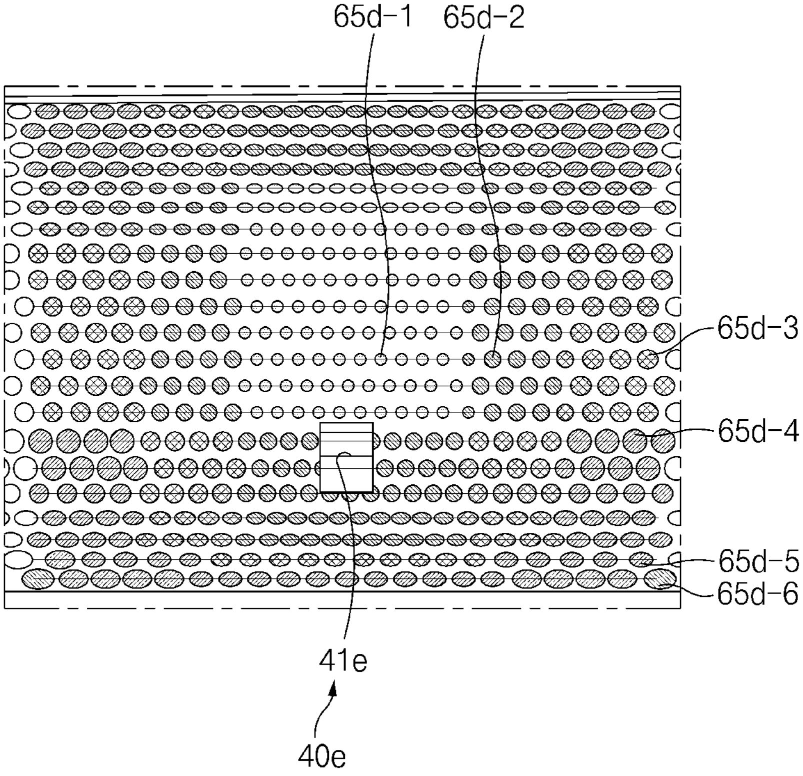
FIG. 14 illustrates the lamp for a vehicle according to the fifth embodiment of the present disclosure, and is an enlarged view of a portion of FIG. 13.

FIG. 11 is a cross-sectional view illustrating a lamp for a vehicle according to a fifth embodiment of the present disclosure. FIG. 12 is a view of a reflection part according to the fifth embodiment of the present disclosure, when viewed from a lower side. FIG. 13 is a front view illustrating the lamp for a vehicle according to the fifth embodiment of the present disclosure, when viewed from a front side. FIG. 14 illustrates the lamp for a vehicle according to the fifth embodiment of the present disclosure, and is an enlarged view of a portion of FIG. 13.

Referring to FIGS. 11 to 14, a lamp 10*d* for a vehicle according to a fifth embodiment of the present disclosure may include the board part 30*d*, the light source part 40*d* including a plurality of light sources 41*d*, the lens part 50*d*, and the reflection part 60*d* including a reflective surface 61*d*.

Furthermore, the reflective surface 61*d* may include a deposition area 65*d* that is an area, in which the phosphor 63*d* is deposited, and a non-deposition area that is the remaining area other than the deposition area 65*d*.

In detail, the deposition area may be formed at a portion of a surface of the reflective surface 61*d*, which faces the lens part 50*d*, and the phosphor 63*d* may be deposited to have a specific shape. Among the light that is emitted from the light source part 40*d* and reaches the reflective surface 61*d*, the light that reaches the deposition area 65*d* may be reflected toward the output direction D1. Then, the light that reaches the deposition area 65*d* may have a reflectivity that is higher than that of the light that reaches the non-deposition area, due to the phosphor 63*d*, and may have a color that is different from that of the light that reaches the non-deposition area.

Accordingly, according to the shape of the deposition area 65*d*, an image and a color of the lamp that is irradiated in the output direction D1 may become various. Accordingly, a lamp image having a differentiated design may be implemented by forming the deposition area 65*d* in a standardized pattern or an atypical shape.

For example, the deposition area 65*d* may include a plurality of unit patterns having a circular shape. However, the present disclosure is not limited thereto, and the deposition area 65*d* may have an elliptical or polygonal shape.

Furthermore, for example, the deposition area 65*d* may include a plurality of pattern groups, and each of the plurality of pattern groups may include a plurality of unit patterns having the same size.

Furthermore, the sizes of the unit patterns may become larger as the pattern groups including the unit patterns are located at locations that are farther from a center of the light source 41*d*.

In detail, in the specification, among the unit patterns that form the deposition area 65*d*, the unit patterns disposed within a specific distance range from the light source 41*d* are defined as one pattern group. Then, the unit patterns included one pattern group may have the same size.

For example, referring to FIG. 14, reference numerals 65*d*-1, 65*d*-2, 65*d*-3, 65*d*-4, 65*d*-5, and 65*d*-6 denote the pattern groups located at locations that are farther from the light source 41*d*, in a sequence thereof. When the sizes of the unit pattern are compared, it may be identified that the sizes of the unit patterns become larger as the unit patterns are located at locations that are farther from the light source part 40*d* (65*d*-1<65*d*-2<65*d*-3<65*d*-4<65*d*-5<65*d*-6).

In this way, an amount of the reflected light may be to be smaller by decreasing deposition of the unit patterns that are closer to the light source 41*d*, and an amount of the reflected light may be to be larger by increasing deposition of the unit patterns that are farther from the light source 41*d*. Accordingly, a lamp image having a uniform intensity of light as a whole may be implemented regardless the distances from the light source 41*d*.

The reason why some of the shapes of the unit patterns are viewed as if they were not circular but elliptical in FIG. 14 is that it is a view illustrating the reflective surface 61*d* having a curved surface, when viewed from a lower side.

Sixth Embodiment

Figure 15:
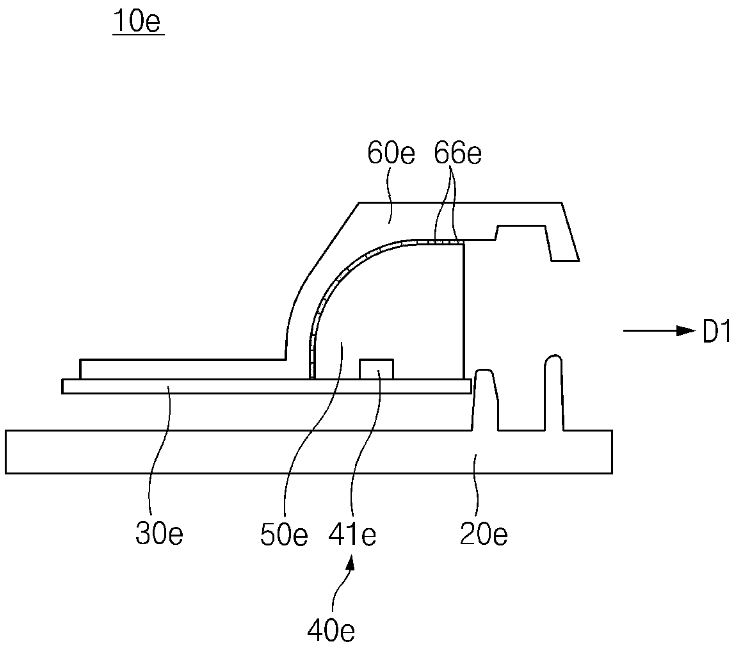
FIG. 15 is a cross-sectional view illustrating a lamp for a vehicle according to a sixth embodiment of the present disclosure.
Figure 16:
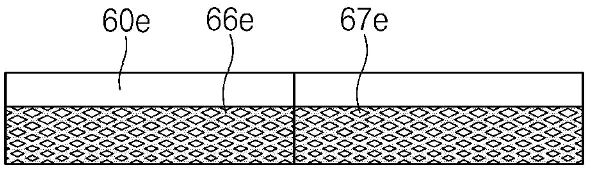
FIG. 16 is a view of a reflection part according to the sixth embodiment of the present disclosure, when viewed from a lower side.
Figure 17:
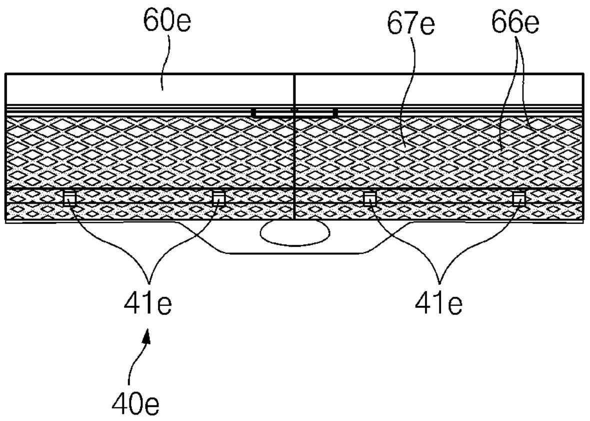
FIG. 17 is a front view illustrating the lamp for a vehicle according to the sixth embodiment of the present disclosure, when viewed from a front side.
Figure 18:
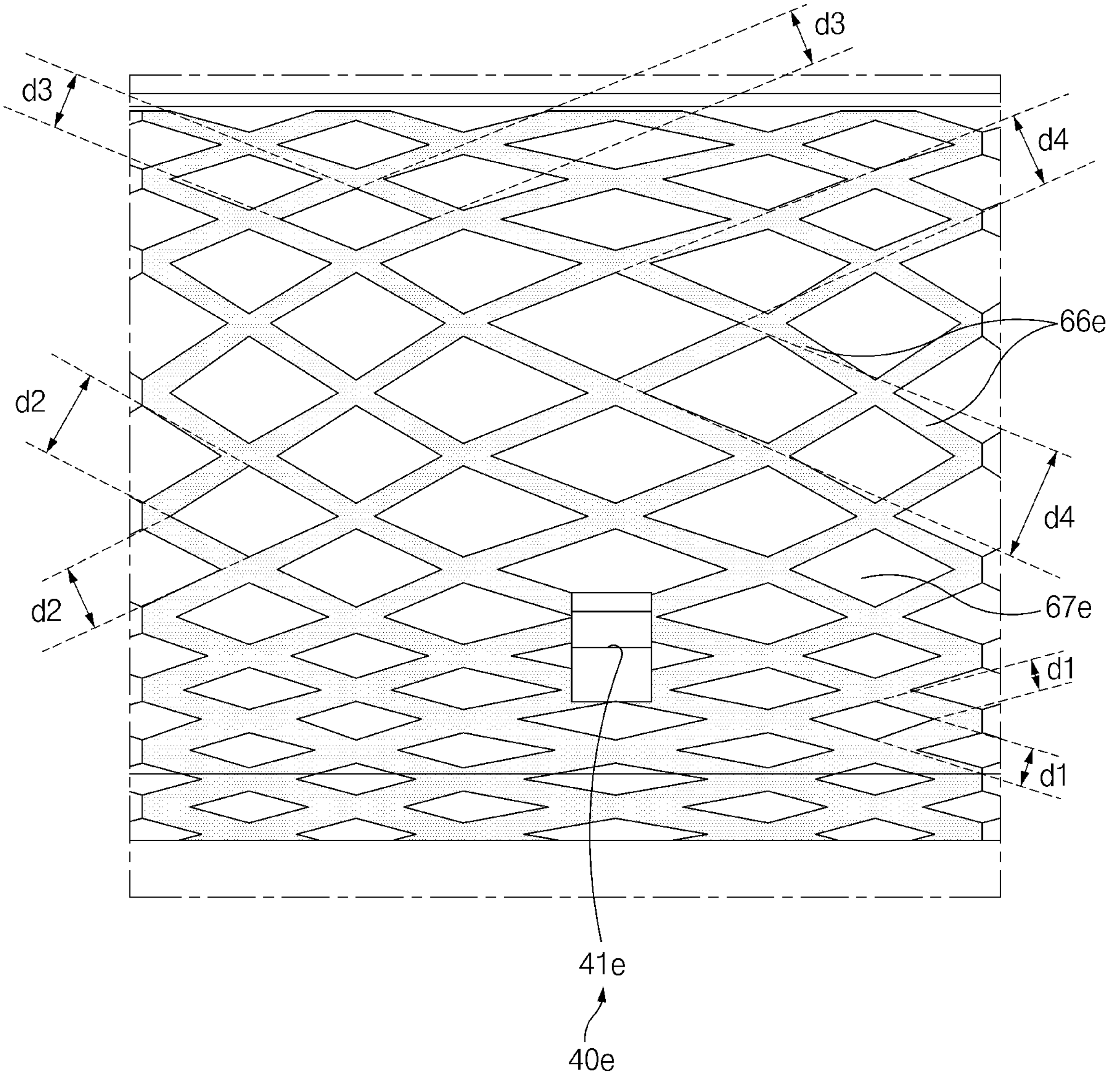
FIG. 18 illustrates the lamp for a vehicle according to the fifth embodiment of the present disclosure, and is an enlarged view of a portion of FIG. 17.

FIG. 15 is a cross-sectional view illustrating a lamp for a vehicle according to a sixth embodiment of the present disclosure. FIG. 16 is a view of a reflection part according to the sixth embodiment of the present disclosure, when viewed from a lower side. FIG. 17 is a front view illustrating the lamp for a vehicle according to the sixth embodiment of the present disclosure, when viewed from a front side. FIG. 18 illustrates the lamp for a vehicle according to the fifth embodiment of the present disclosure, and is an enlarged view of a portion of FIG. 17.

Referring to FIGS. 15 to 18, a lamp 10*e* for a vehicle according to a sixth embodiment of the present disclosure may include the board part 30*e*, the light source part 40*e* including a plurality of light sources 41*e*, the lens part 50*e*, and the reflection part 60*e* including a reflective surface 61*e*.

Furthermore, the reflective surface 61*e* may include a deposition area 66*e* that is an area, in which the phosphor 63*e* is deposited, and a non-deposition area 67*e* that is the remaining area other than the deposition area 66*e*.

In detail, the deposition area may be formed at a portion of a surface of the reflective surface 61*e*, which faces the lens part 50*e*, and the phosphor 63*e* may be deposited to have a specific shape. Accordingly, according to the shape of the deposition area 66*e*, an image and a color of the lamp that is irradiated in the output direction D1 may become various. Accordingly, a lamp image having a differentiated design may be implemented by forming the deposition area 66*e* in a standardized pattern or an atypical shape.

For example, the deposition area 66*e* may include a plurality of unit patterns that have a line shape and cross each other to form a lattice shape. Furthermore, the non-deposition area 67*e* may include a plurality of lattice areas by the plurality of unit patterns.

Intervals between adjacent ones of the plurality of unit patterns may become larger as they are located at locations that are farther from the light source 41*e*.

In detail, because the size of the deposition area 66*e* per unit area increases as the distances between the unit pattern having the line shape becomes smaller, reflectivity may be enhanced. Furthermore, reflectivity may become lower as the size of the deposition area 66*e* per unit area becomes smaller. Accordingly, the reflectivity may be adjusted by adjusting the intervals between the adjacent unit patterns.

Accordingly, in the unit patterns having the line shape according to the sixth embodiment, the widths of the unit patterns may be constant (about 0.4 mm), and the intervals therebetween may become larger as the unit patterns are located at locations that are farther from the light source 41*e*.

For example, FIG. 18 illustrates the intervals d1, d2, d3, and d4 between the unit patterns having the line shape, of which distances from the light source 41*e*. Referring to FIG. 18, reference numerals d1, d2, d3, and d4 denote intervals between the unit patterns located at locations that are farther from the light source 41*e* in a sequence thereof. When the intervals between the unit patterns are compared, it may be identified that the intervals between the unit patterns become larger as the unit patterns are located at locations that are farther from the light source 41*e* (d1<d2<d3<d4).

As an example, when a thickness of the unit pattern having the line shape is 0.4 mm, d1 may be about 0.7 mm, d2 may be about 1.1 mm, d3 may be about 2 mm, and d4 may be about 2.6 mm. However, the present disclosure is provided for describing an example, and the thicknesses of and the intervals between the unit patterns having the line shape are not limited thereto.

The reason why the lattice shape that is the non-deposition area 67*e* is viewed as if they were not rectangular but rhombic in FIGS. 16 to 18 is that the reflective surface 61*e* having the curved shape is viewed from a lower side.

According to the embodiment of the present disclosure, the phosphor may be implemented in the reflection part while not adding any separate process by depositing the phosphor on the reflective surface when the reflection part is injection-molded, and the image may be differentiated by enhancing optical uniformity.

Furthermore, according to the embodiment of the present disclosure, optical patterns having various wavelengths and colors may be implemented by varying a color of the phosphor deposited on the reflective surface when the reflection part is manufactured.

Furthermore, according to the embodiment of the present disclosure, a travel path of the light emitted from the light source may be controlled by securing the air gap such that the air gap is long, and thus, optical efficiency may be increased by minimizing diffusion of the light.

According to the embodiment of the present disclosure, the phosphor may be efficiently implemented without adding a separate process by depositing the phosphor on the reflective surface when the reflection part is injection-molded.

Furthermore, according to an embodiment of the present disclosure, a uniformity of the light may be enhanced by depositing the phosphor on the reflective surface, and images may be differentiated.

Furthermore, according to the embodiment of the present disclosure, optical patterns having various wavelengths and colors may be implemented by varying a color of the phosphor deposited on the reflective surface when the reflection part is manufactured.

Furthermore, according to an embodiment of the present disclosure, because an optical structure, in which a travel path of the light irradiated from the light source is changed such that the light is output, is applied, an air gap that is an interval between the light source part and the reflection surface or between the reflective surface and the inner lens may be secured to be long. Accordingly, according to the present disclosure, the light emitted from the light source 41 may be refracted and reflected in a specific direction, and thus, diffusion of the light may be minimized and optical efficiency may be enhanced.

Although the specific embodiments of the present disclosure have been described until now, the spirit and scope of the present disclosure are not limited to the specific embodiments, and may be variously corrected and modified by an ordinary person in the art, to which the present disclosure pertains, without changing the essence of the present disclosure claimed in the claims.

What is claimed is:

1. A lamp for a vehicle comprising:

a board part;

a light source part disposed on an upper surface of the board part and comprising a plurality of light sources that irradiate light;

a lens part installed to surround the light source part and disposed on an upper side of the board part; and a reflection part installed on an upper side of the board part, and comprising a reflective surface that reflects the light irradiated from the light source part to change a travel path of the light, wherein the reflective surface is configured to contact the lens part and phosphor is deposited thereon.

2. The lamp of claim 1, further comprising:

an inner lens disposed on an output direction of the lens part, wherein the output direction is a direction in which the light reflected by the reflection part is output, and the inner lens is configured to output the light reflected by the reflection part to an outside of the lamp.

3. The lamp of claim 2, further comprising:

a housing installed on a lower side of the reflection part, wherein the board part, the light source part, the lens part, and the inner lens are installed between the reflection part and the housing.

4. The lamp of claim 1, wherein the phosphor is deposited in an entire area of the reflective surface.

5. The lamp of claim 1, wherein optics protruding from a surface of the lens part, which contacts the reflection part, are formed in the lens part, and the reflective surface has grooves corresponding to the optics.

6. The lamp of claim 5, wherein the optics and the grooves are repeatedly formed along an upward direction, and the optics are formed to become gentler as they go in the upward direction.

7. The lamp of claim 1, wherein the reflective surface comprises a plurality of reflective grooves that are recessed, and the plurality of reflective grooves are repeatedly formed in an upward/downward direction and a leftward/rightward direction of the reflective surface.

8. The lamp of claim 7, wherein the reflective grooves have a triangular pyramid shape.

9. The lamp of claim 7, wherein the reflective grooves have a hexagonal pyramid shape.

10. The lamp of claim 1, wherein the reflective surface comprises:

a deposition area that is an area in which the phosphor is deposited; and a non-deposition area that is a remaining area other than the deposition area.

11. The lamp of claim 10, wherein the deposition area comprises a plurality of unit patterns having a circular shape.

12. The lamp of claim 11, wherein the deposition area comprises a plurality of pattern groups, each of the plurality of pattern groups comprises a plurality of unit patterns having a same size, and sizes of the unit patterns become larger as the pattern groups of the unit patterns are located at locations that are farther from a center of the light source.

13. The lamp of claim 10, wherein the deposition area has a plurality of unit patterns having a line shape and crossing each other to form a lattice shape, and the non-deposition area comprises a plurality of lattice areas by the plurality of unit patterns.

14. The lamp of claim 13, wherein intervals between adjacent ones of the plurality of unit patterns become larger as the adjacent ones are located at locations that are farther from the light source.

* * * * *